United States Patent
Talwar et al.

(10) Patent No.: US 7,643,458 B1
(45) Date of Patent: Jan. 5, 2010

(54) COMMUNICATING BETWEEN WIRELESS COMMUNITIES

(75) Inventors: Vanish Talwar, Palo Alto, CA (US); Zhichen Xu, San Jose, CA (US); Dejan Milojicic, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 444 days.

(21) Appl. No.: 11/137,838

(22) Filed: May 25, 2005

(51) Int. Cl.
*H04W 4/00* (2006.01)

(52) U.S. Cl. .......... 370/338; 370/254; 370/238; 455/435.1; 455/435.2; 455/435.3; 455/433; 455/456.2; 709/223; 709/238; 709/220; 709/242; 709/228

(58) Field of Classification Search .......... 370/254, 370/351, 352, 338, 256, 238; 709/228, 243, 709/223, 238, 220, 242; 726/28; 713/168; 455/435.1, 435.2, 435.3, 433, 456.2, 414.1, 455/414.2, 445
See application file for complete search history.

(56) References Cited

U.S. PATENT DOCUMENTS

| | | | | |
|---|---|---|---|---|
| 2003/0129985 A1* | 7/2003 | Naden et al. | ............... | 455/447 |
| 2004/0064693 A1* | 4/2004 | Pabla et al. | ............... | 713/168 |
| 2005/0223102 A1* | 10/2005 | Zhang et al. | ............... | 709/228 |
| 2006/0187900 A1* | 8/2006 | Akbar | ............... | 370/352 |
| 2006/0191020 A1* | 8/2006 | Miller | ............... | 726/28 |

* cited by examiner

*Primary Examiner*—Vincent P Harper
*Assistant Examiner*—Khai M Nguyen

(57) ABSTRACT

A message is received from a first wireless node in a first wireless community. The message is for a second wireless node in a second wireless community. Location information for the second wireless node is determined using a distributed hash table (DHT) overlay network. The message is routed to a second wireless community using the location information.

20 Claims, 5 Drawing Sheets

COMMUNICATING BETWEEN WIRELESS COMMUNITIES

TECHNICAL FIELD

The technical field relates generally to wireless communities, and more particularly to communicating between wireless communities.

BACKGROUND

Given the substantial increase in use of wireless devices which are operable to access the Internet, such as laptops, personal digital assistants, and cellular phones, the number of wireless communities, public as well as private, has grown considerably. For example, it is not uncommon to walk into any well known coffee shop and see people accessing the Internet via a wireless community made available by the coffee shop.

The prevalence of these wireless communities represents an important trend that users are no longer satisfied with only being able to access the Internet from their desk or home. Instead, users are demanding information services wherever they go. The wireless communities allow users to access the Internet at different locations and possibly communicate with other users via email. However, outside of email, a wireless community typically does not allow a user to communicate with other users in different wireless communities.

SUMMARY

According to an embodiment, a message is received from a first wireless node in a first wireless community. The message is for a second wireless node in a second wireless community. Location information for the second wireless node is determined using a distributed hash table (DHT) overlay network. The message is routed to a second wireless community using the location information.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the embodiments are described. Moreover, in the following detailed description, references are made to the accompanying figures, which illustrate specific embodiments. Electrical, mechanical, logical and structural changes may be made to the embodiments without departing from the spirit and scope of the embodiments.

1. System Overview

Figure 1:
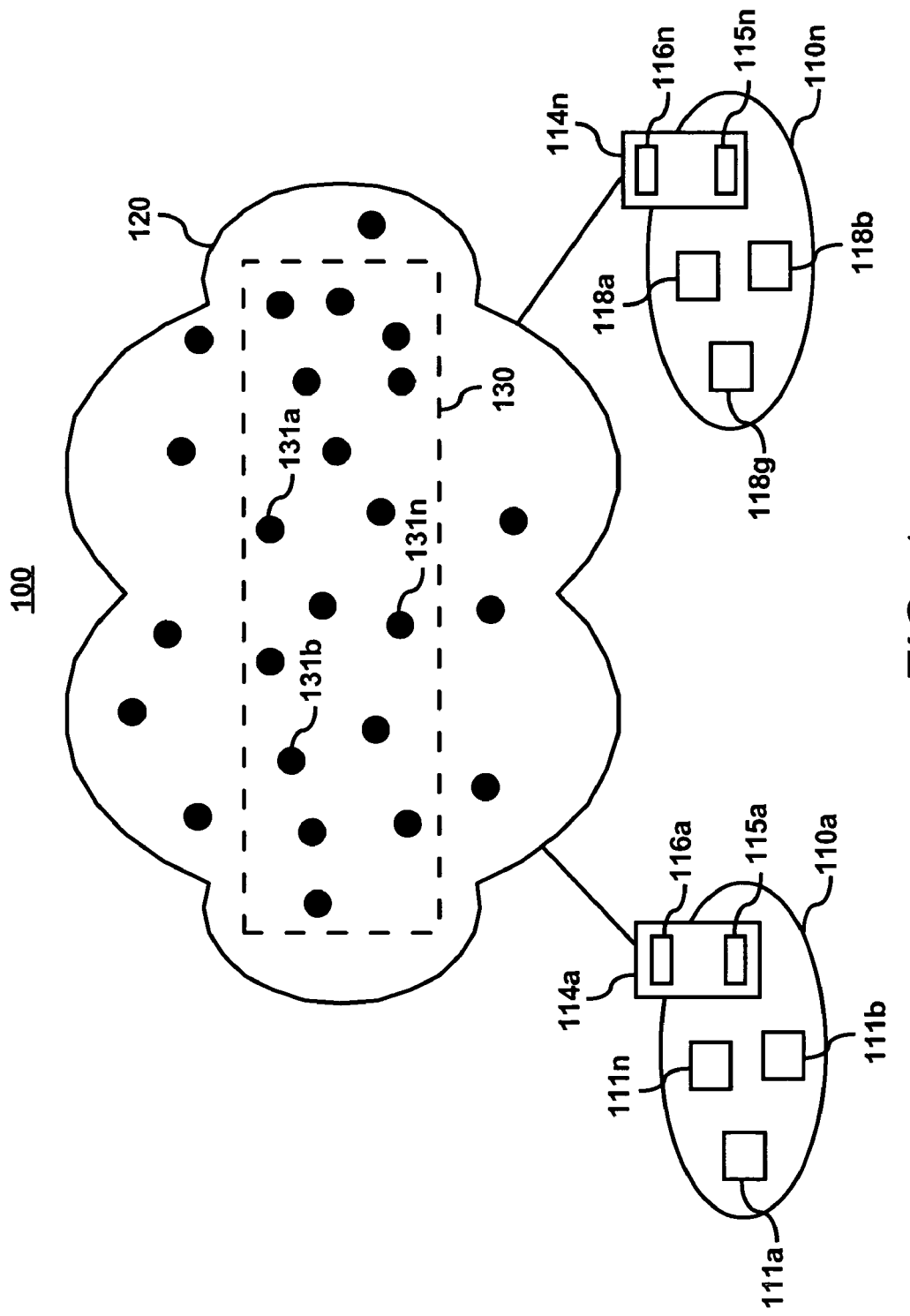
FIG. 1 illustrates a system, according to an embodiment.

FIG. 1 illustrates a system 100 including wireless communities 110*a* . . . *n* connected via a peer-to-peer network 120. The wireless communities 110*a* . . . *n* each typically include a plurality of wireless devices that communicate using a wireless protocol and that are within a predetermined range. For example, the wireless community 110*a* includes a plurality of wireless devices 111*a* . . . *x*. Examples of the wireless devices 111*a* . . . *x* include cellular phones, personal digital assistants, laptops, etc. Each of the wireless devices 111*a* . . . *x* is within range of a wireless network for the wireless community 110*a* and each wireless device 111*a* . . . *x* communicates with other members of the wireless community 110 using the same wireless protocol. For example, each of the wireless devices 110*a* . . . *x* includes a wireless interface using the 802.11g wireless protocol.

Another example of a wireless community in the system 100 is the wireless community 110*n* including the wireless devices 118*a* . . . *g*. The wireless devices 118*a* . . . *g* may communicate using a wireless protocol different from the wireless community 110*a*, such as Bluetooth. In this example, the wireless communities 110*a* and 110*n* may be within range of each other, but the members of the different communities cannot communicate directly with each other because they are using different wireless protocols. Alternatively, the wireless communities 110*a* and 110*n* may use the same wireless protocol. However, the wireless communities 110*a* and 110*n* may not be within range of each other. Thus, the members of the different communities cannot communicate directly with each other.

2. Wireless Device Registration with the DHT Overlay Network

According to an embodiment, the system 100 includes a DHT overlay network 130 overlaying the peer-to-peer network 120 and providing a location and routing services allowing members of different wireless communities to communicate with each other. The DHT overlay network 130 and the location and routing services are described in further detail below. Each of the wireless communities 110*a* . . . *n* may include a wired node providing an interface to the DHT overlay network 130. For example, the wireless community 110*a* includes a wired node 114*a* with a wireless interface 115*a* supporting 802.11g for communicating with the other members of the wireless community 110*a*, such as the wireless devices 111*a* . . . *x*. The wired node 114*a* may include a second interface 116*a* for communicating with the peer-to-peer network 120, which may include nodes in the Internet. The second interface 116*a* may include an interface, such as a cable modem, DSL modem, or a T1 interface. The second interface 116*a* may be an interface to the peer-to-peer network 120 through a local Internet service provider. A similar wired node 114*n* is shown for the wireless community 110*n*, including a wireless interface 115*n* for communicating with the members of the wireless community 110*n*, such as the wireless devices 118*a* . . . *g*, and including a second interface 116*n* connecting the wired node 114*n* to the peer-to-peer network 120.

The nodes 114*a* and 114*n* are referred to as wired nodes. Wired nodes are nodes that may not be mobile like the wireless devices 111*a* . . . *x* and 118*a* . . . *g*. The wireless devices 111*a* . . . *x* and 118*a* . . . *g* may be transient, such that they join and leave wireless communities frequently. The wired nodes 114*a* and 114*n* are typically fixed and may not leave their respective wireless communities unless the wired nodes 114*a* and 114*n* are being replaced or serviced. However, it will be apparent to one of ordinary skill in the art that a mobile wireless device with two interfaces, such as the interfaces 115a and 116a, may be used for a wired node. Also, the wired nodes 114a . . . n communicate with the peer-to-peer network 120, which includes many wired nodes.

The DHT overlay network 130 is used for storing location information for members of wireless communities and for routing. DHT overlay networks are logical representations of an underlying physical network, such as the peer-to-peer network 120. The DHT overlay network 130 provides, among other types of functionality, data placement, information retrieval, and routing. DHT overlay networks have several desirable properties, such as scalability, fault-tolerance, and low management costs. Some examples of DHT overlay networks that may be used in the embodiments include content-addressable-network (CAN), PASTRY, and CHORD. A DHT overlay network provides a hash table abstraction that maps keys to values. For example, data is represented in an overlay network as a (key, value) pair, such as (K1, V1). K1 is deterministically mapped to a point P in the overlay network using a hash function, e.g., P=h(K1). An example of a hash function is checksum or a space filling curve when hashing to spaces of different dimensions. The key value pair (K1, V1) is then stored at the point P in the overlay network, which may include a node owning the zone where point P lies depending on the type of DHT overlay network being used. The same hash function is used to retrieve data, and this hash function is used by all the nodes in the DHT overlay network. For example, the hash function is used to calculate the point P from K1. Then, the data is retrieved from the node for the point P.

Overlay routing may be performed by the nodes in the DHT overlay network 130 according to the type of overlay network being used. For example, for CAN a node in the overlay network determines whether a message received is destined for that node. If not, the node routes the message to its neighbor towards the destination node.

The DHT overlay network 130 includes nodes 131 in the peer-to-peer network 130. The peer-to-peer network 120 may also include nodes outside the DHT overlay network 130, such as shown in FIG. 1. The nodes 131 in the DHT overlay network store location information for the members of the wireless communities 110a . . . n. When a wireless device joins a wireless community, the wireless device registers with the DHT overlay network 130, resulting in location information for the registering device being stored at one or more of the nodes 131.

For example, the wireless device 111a joins the wireless community 110a. The wireless device 111a transmits its unique ID to the wired node 114a. Each member of a wireless community including a new member joining a wireless community is represented by a unique ID. The unique ID may be assigned by the location service or selected by a user. The wired node 114a hashes the unique ID of the wireless device 111a to identify a node in the DHT overlay network 130, such as the node 131a. The wired node 114a transmits to the node 131a in the DHT overlay network 130 the unique ID of the wireless device 111a, an address of the wired node 114a, such as an IP address, and possibly a name of the wireless community 110a. The name of the wireless community may not be used because the wireless community is located and may be referenced by the IP address of the wired node for the wireless community. An example of the location information for the wireless device 111a may include <ID for wireless device 111a, IP address of the node 114a, wireless community 110a>. This location information is transmitted by the wired node 114a to the node 131a for storage in the node 131a.

Location information is stored in the DHT overlay network 130 for each member of the wireless communities 110a . . . n. Whenever a mobile device moves to a new wireless community, its location information in the DHT overlay network 130 is updated. As the wireless devices keep moving, the wired infrastructure, which includes the DHT overlay network 130 and the wired nodes in the wireless communities, may replicate location information for at least some of the wireless devices in close proximity to the wireless devices. For example, location information for the wireless device 111a is stored in the node 131a. The wired node 114a determines that there is a high latency, for example greater than a predetermined threshold, when communicating with the node 131a. The wired node 114a also measures latency to other nodes in the DHT overlay network that it has communicated with, such as the nodes 131b and 131n. The wired node 114a sends a request to the node 131b because it has the lowest latency. The node 131b may then store the location information for the wireless device 111a, and the wired node 114a may communicate with the node 131b when it needs to determine the location of the wireless device 111a, as it may move from wireless community to wireless community. The wired node 114a may store a list of all the nodes in the DHT overlay network 130 that store location information for wireless devices that are or were members of the wireless community 110a.

3. Communicating Between Wireless Communities

Wireless devices in different communities may use the location and routing services provided by the DHT overlay network 130 to communicate with each other. For example, the user of the wireless device 111a wants to send a message to the wireless device 118a. The wireless device 111a transmits a request using the local wireless protocol to the wired node 114a including the message and the unique ID of the wireless device 118a. It is assumed the unique ID of the wireless device to receive the message is known. The wired node 114a hashes the unique ID of the wireless device 118a to identify a node in the overlay network 130 storing location information for the wireless device 118a, which may be the node 131b.

The wired node 114a may already store an identification of the node storing the location information for the wireless device 118a, because that wireless device 118a may have previously been a member of the wireless community 110a. Thus, the wired node 114a may simply reference its local storage to determine the identity of the node 131b, which may include an IP address of the node 131b. The wired node 114a may reference its local storage for location information before hashing an ID to determine where location information is stored in the DHT overlay network 130.

After the node 131b in the DHT overlay network 130 storing the location information for the wireless device 118a is identified, the wired node 114a transmits the message to the node 131b using overlay routing. The node 131b receives the message and forwards the message to the wired node 114a for the wireless community 110n. For example, the location information for the wireless device 118a may include the IP address of the wired node 114n. Thus, IP routing is used to transmit the message from the node 131b to the wired node 114n. The wired node 114n then uses the protocol of the wireless community 110n to transmit the message to the wireless device 118a. For example, the wired node 114n may broadcast the message to all the wireless devices in the wireless community 114n. Alternatively, the message may be unicast to the wireless device 118a. If a wireless device desires to communicate with a wireless device in its own community, instead of using the location service of the DHT overlay network 130, local protocol may be used for communicating between devices within the same wireless community, such as is known in the art.

In another embodiment, instead of transmitting the message to the DHT overlay network 130 and then forwarding the message to the wired node of the wireless community where the receiving wireless device is located, the location information is transmitted back to the source. For example, the wired node 114a receives the location information for the wireless device 118a from the node 131b. The wired node 114a then transmits the message to the wired node 114n for the wireless community 110n using the location information for the wireless device 118a.

Figure 2:
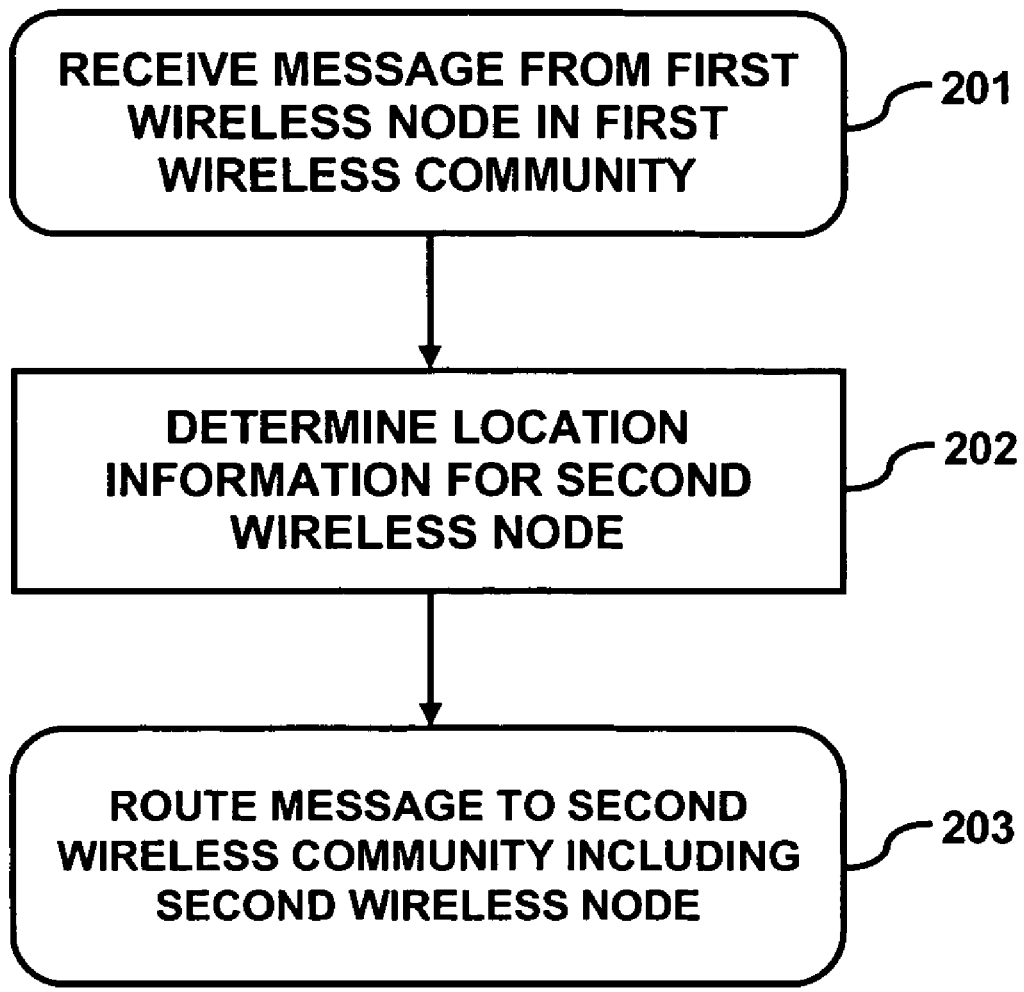
FIG. 2 illustrates a flow chart of a method for communicating between wireless communities, according to an embodiment.

FIG. 2 illustrates a flow chart of a method for transmitting information between wireless communities, according to an embodiment. FIG. 2 is described with respect to the system 100 shown in FIG. 1 by way of example and not limitation.

At step 201, the wired node 114a receives a message from a first wireless node 111a in a first wireless community 110a, wherein the message is for a second wireless node 118a. A node as used herein is any type of computer system, which can be wired, such as the wired nodes 114a . . . *n* or one or more of the nodes 131 in the DHT overlay network 130. A node may also be wireless, such as the wireless devices in the wireless communities 110a . . . 110n.

At step 202, the wired node 114a determines location information for the second wireless node 118a using the DHT overlay network 130. For example, the wired node 114a hashes a unique ID for the wireless node 118a to identify a node in the DHT overlay network 130, such as the node 131b storing the location information. Prior to hashing the ID of the wireless node 118a, the wired node 114a may determine whether the location information for the wireless device 118a or the identity of the node in the DHT overlay network 130 storing the location information for the wireless device 118a had previously been stored in local storage for the wired node 114a.

At step 203, the wired node 114a routes the message to the second wireless community 110n including the second wireless node 118a using the location information. In one embodiment, the message is routed via the DHT overlay network 130 to the node 131b and the node 131b uses the location information to route the message to the second wireless community 110n. In another embodiment, the wired node 114a transmits a request for the location information to the DHT overlay network 130, which is routed via the DHT overlay network 130 to the node 131b. The node 131b receives the request and transmits the location information for the wireless node 118a to the wired node 114a. The wired node 114a uses the location information to route the message to the second wireless community 110n.

Figure 3:
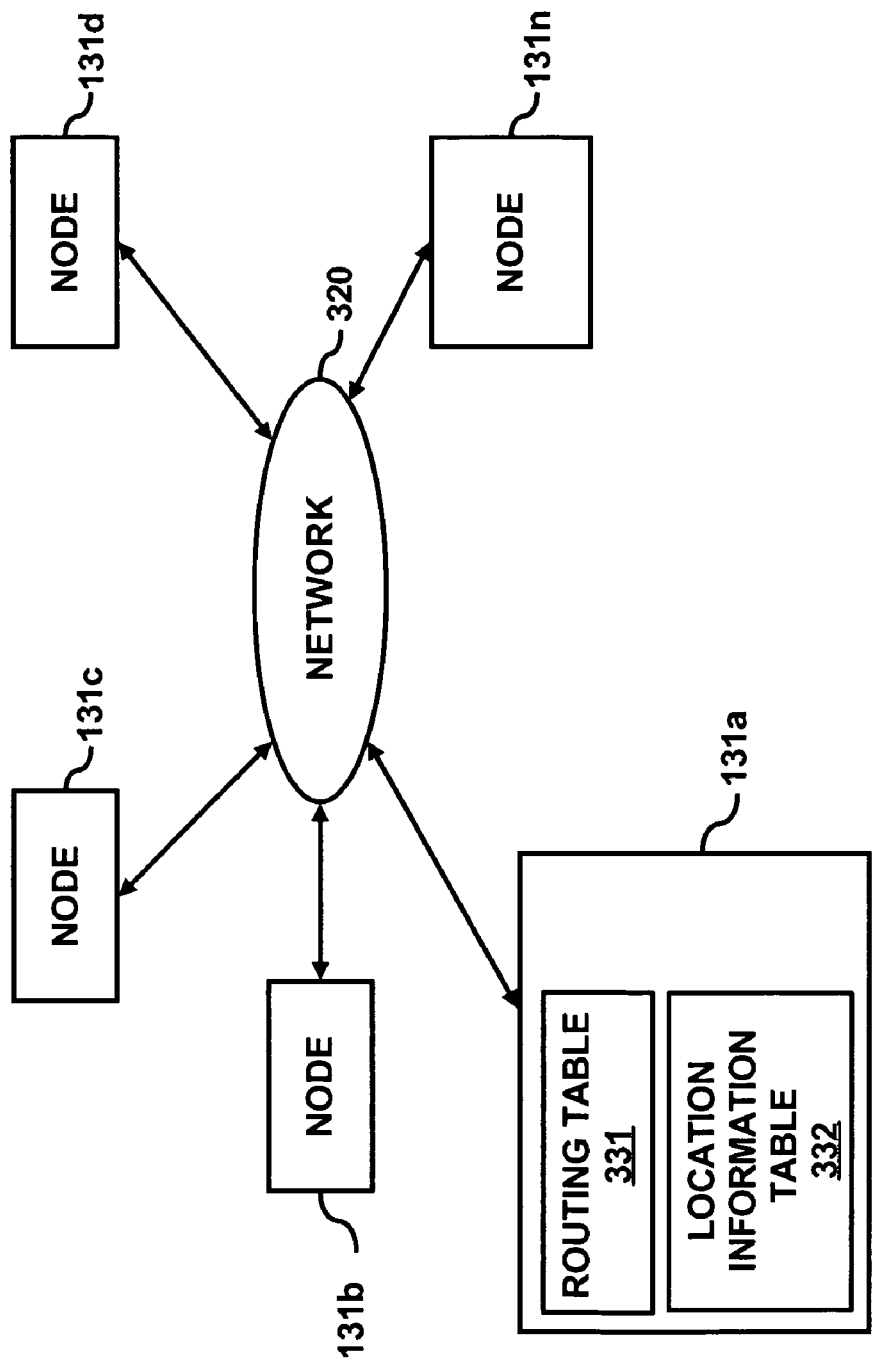
FIG. 3 illustrates a peer-to-peer communications model, according to an embodiment.

FIG. 3 illustrates a peer-to-peer communications model that may be used by the underlying physical network, such as the peer-to-peer network 120 shown in FIG. 1, according to an embodiment. Peer-to-peer networks are commonly used as the underlying physical network for DHT overlay networks. The peer-to-peer network 120 includes a plurality of nodes 131a . . . *n* functioning as peers in a peer-to-peer network. The nodes 131a . . . *n* exchange information among themselves and with other network nodes over a network 320. The nodes 131a . . . *n* may also determine which nodes 131a . . . *n* perform other functions of a peer in a peer-to-peer network, such as overlay functions, object search and retrieval, object placement, storing and maintaining tables including location information for wireless devices in the wireless communities 110a . . . *n* shown in FIG. 1, etc. The nodes 131a . . . *n* may be computer systems, such as servers, personal computers, personal digital assistants, laptop computers, workstations, and other similar devices that have a network interface. The nodes 131a . . . *n* may be further operable to execute one or more software applications (not shown) that include the capability to share information (e.g., data, applications, etc.) in a peer-to-peer manner and the capability to operate as nodes in the DHT overlay network 130.

The network 320 may be operable to provide a communication channel among the nodes 131a . . . *n*. The network 320 may be implemented as a local area network, wide area network or combination thereof. The network 320 may implement wired protocols, such as Ethernet, token ring, etc., wireless protocols, such as Cellular Digital Packet Data, Mobitex, IEEE 302.11b, Bluetooth, Wireless Application Protocol, Global System for Mobiles, etc., or a combination thereof.

Some of the information that may be stored in the nodes 131a . . . *n* is shown for node 131a. The node 131a stores a DHT overlay routing table 331 and a location information table 332. The location information table 332 may include the location information for each wireless device having an ID that is hashed to the node 131a. The location information for a wireless device may be a unique wireless device ID, a wireless community ID (e.g., IP address of a wired node), and possibly other information associated with the location of a wireless device, such as a wireless community name, etc.

Figure 4:
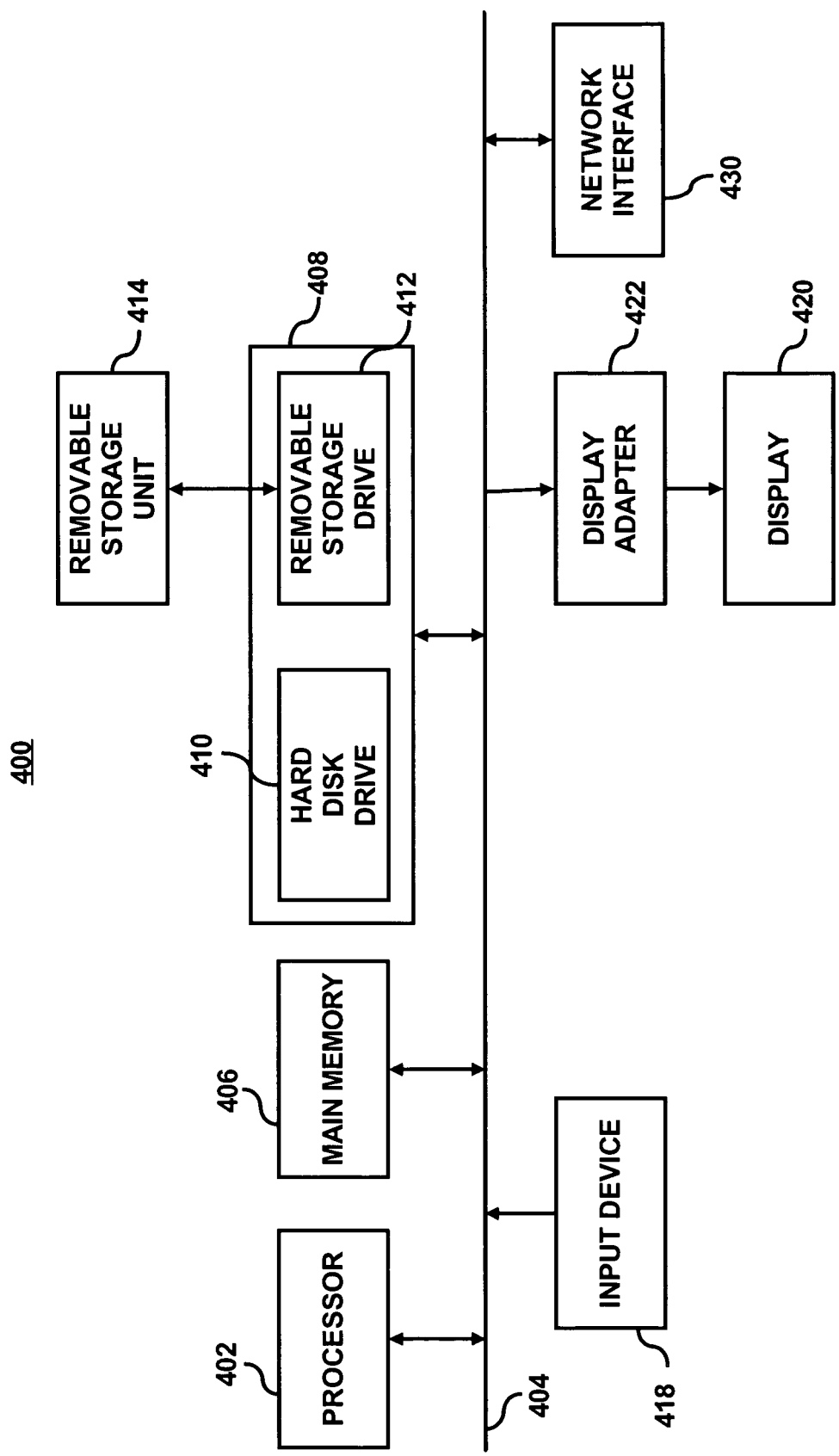
FIG. 4 illustrates an exemplary computer system for a peer-to-peer node, according to an embodiment.

FIG. 4 illustrates an exemplary block diagram of a computer system 400 that may be used as a node in the peer-to-peer network 120 shown in FIGS. 1 and 3. The computer system 400 includes one or more processors, such as processor 402, providing an execution platform for executing software.

Commands and data from the processor 402 are communicated over a communication bus 404. The computer system 400 also includes a main memory 406, such as a Random Access Memory (RAM), where software may reside during runtime, and a secondary memory 408. The secondary memory 408 includes, for example, a hard disk drive 410 and/or a removable storage drive 412, representing a floppy diskette drive, a magnetic tape drive, a compact disk drive, etc., or a nonvolatile memory where a copy of the software may be stored. The secondary memory 408 may also include ROM (read only memory), EPROM (erasable, programmable ROM), EEPROM (electrically erasable, programmable ROM). In addition to software, routing tables, and location information tables may be stored in the main memory 406 and/or the secondary memory 408. The removable storage drive 412 reads from and/or writes to a removable storage unit 414 in a well-known manner.

A user interfaces with the computer system 400 with one or more input devices 48, such as a keyboard, a mouse, a stylus, and the like. The display adaptor 422 interfaces with the communication bus 404 and the display 420 and receives display data from the processor 402 and converts the display data into display commands for the display 420. A network interface 430 is provided for communicating with other nodes via the network 320 shown in FIG. 3.

Figure 5:
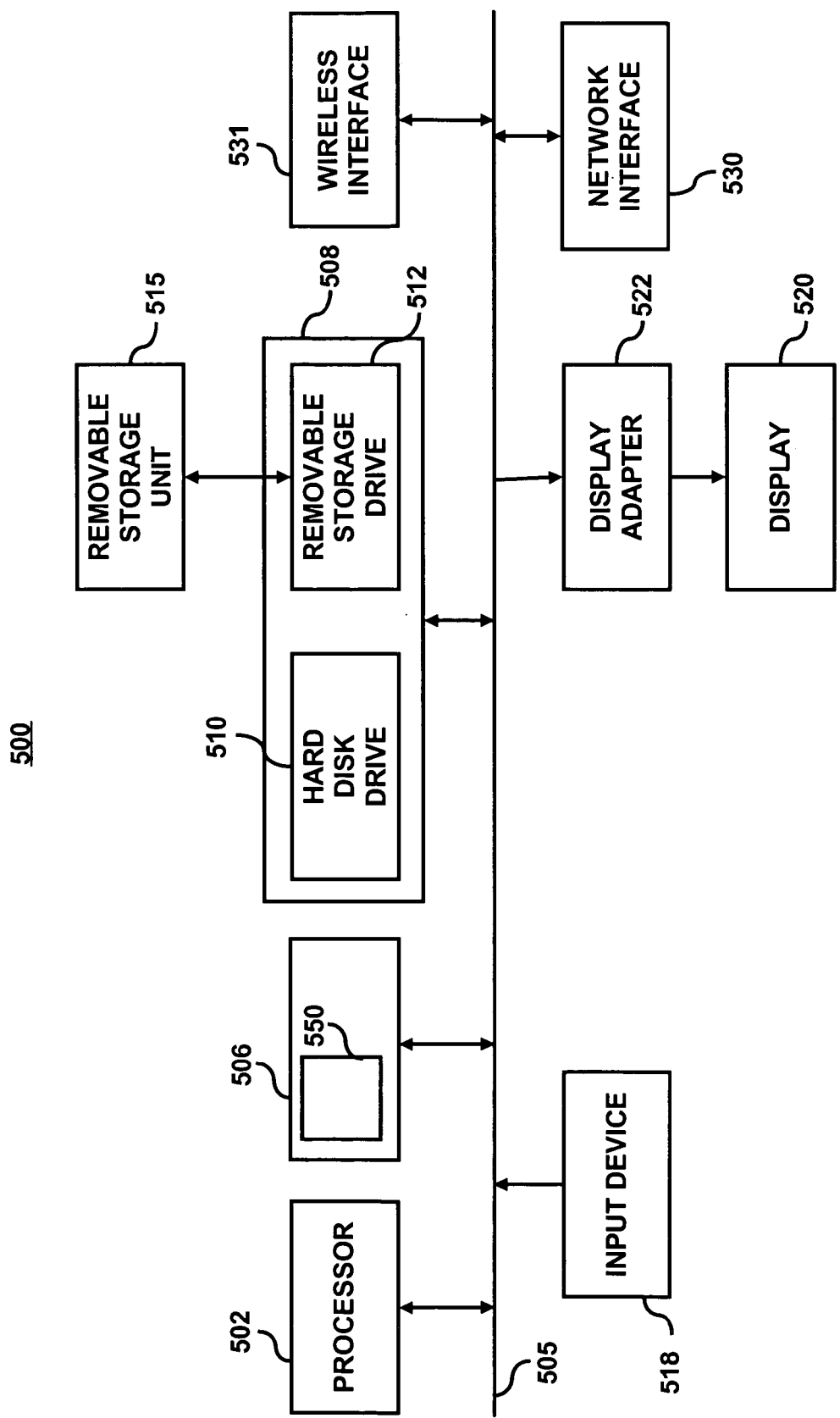
FIG. 5 illustrates an exemplary computer system for a wired node, according to an embodiment.

FIG. 5 illustrates an exemplary block diagram of a computer system 500 that may be used as a wired node, such as the wired node 114a. The computer system 500 includes one or more processors, such as processor 502, providing an execution platform for executing software.

Commands and data from the processor 502 are communicated over a communication bus 505. The computer system 500 also includes a main memory 506, such as a Random Access Memory (RAM), where software may reside during runtime, and a secondary memory 508. The secondary memory 508 includes, for example, a hard disk drive 510 and/or a removable storage drive 512, representing a floppy diskette drive, a magnetic tape drive, a compact disk drive, etc., or a nonvolatile memory where a copy of the software may be stored. The secondary memory 508 may also include ROM (read only memory), EPROM (erasable, programmable ROM), EEPROM (electrically erasable, programmable ROM). In addition to software, one or more tables 550 including latency measurements and location information may be stored in the main memory 506 and/or the secondary memory 508. The tables 550 may include latency measurements for latency to each node 131 in the DHT overlay network 130 that the wired node 114a has previously communicated with. The latency measurements may be used to select a node in the DHT overlay network 130 for replicating location information for a wireless device. The tables 550 may also include location information that the wired node 114a has received based on past requests for location information sent to the DHT overlay network 130. The removable storage drive 512 reads from and/or writes to a removable storage unit 515 in a well-known manner.

A user interfaces with the computer system 500 with one or more input devices 58, such as a keyboard, a mouse, a stylus, and the like. The display adaptor 522 interfaces with the communication bus 505 and the display 520 and receives display data from the processor 502 and converts the display data into display commands for the display 520.

The computer system 500 includes a wireless interface 531 for communicating with wireless devices in the wireless community, and a network interface 530 for communicating with other nodes via the network 320 shown in FIG. 3.

It will be apparent to one of ordinary skill in the art that one or more of the components of the computer systems 400 and 500 may not be included and/or other components may be added to the computer systems 400 and 500 as is known in the art. The computer systems 400 and 500 shown in FIGS. 4 and 5 are provided as examples of possible computing platforms that may be used for these devices, and other types of computing platforms may be used as is known in the art.

One or more of the steps of the method 300 may be implemented as software embedded on a computer readable medium and executed on one or more of the computer systems 400 and 500 as described above with respect to the method 300. Other steps performed by a wired node may include determining whether a message received from a first wireless node in a first wireless community is for a second wireless node not in the first wireless community; and determining location information for the second wireless node using a DHT overlay network in response to the message being for the second wireless node. Also, location information may be replicated in the DHT overlay network 130 by identifying one or more nodes in the DHT overlay network to store location information based on latency to the nodes.

The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. The computer readable medium may include the memory 406, 506 and/or 408 and 508 described above with respect to FIGS. 4 and 5. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

Those skilled in the art will readily recognize that various modifications to the described embodiments may be made without departing from the true spirit and scope of the embodiments. The terms and descriptions used herein are set forth by way of illustration only and are not meant as limitations. Those skilled in the art will recognize that these and other variations are possible within the spirit and scope as defined in the following claims and their equivalents.

What is claimed is:

1. A method comprising:
   registering nodes in a first wireless community in a DHT overlay network storing location information for a plurality of wireless communities, each wireless community including a plurality of wireless devices that are configured to communicate with each other using a wireless protocol when within a predetermined range, wherein registering includes storing location information for the first wireless community in the DHT overlay network for any new nodes joining the first wireless community, such that the DHT overlay network is maintained with current location information for wireless nodes as the wireless nodes move from one wireless community of the plurality of wireless communities to another the first wireless community of the plurality of wireless communities;
   receiving a message from a first wireless node in the first wireless community, the message being for a second wireless node;
   determining location information for a second wireless community of the plurality of wireless communities of which the second wireless node is a member using the DHT overlay network; and
   routing the message to a second wireless community including the second wireless node using the location information for the second wireless community.

2. The method of claim 1, wherein determining location information for the second wireless node using a DHT overlay network further comprises:
   determining a location of the second wireless community using the DHT overlay network, the DHT overlay network being a logical representation of an underlying wired, peer-to-peer network.

3. The method of claim 2, wherein determining a location of the second wireless community using the DHT overlay network further comprises:
   hashing a unique ID for the second wireless node; and
   identifying a node in the DHT overlay network storing the location of the second wireless community based on the hashed unique ID.

4. The method of claim 3, wherein routing the message to a second wireless community including the second wireless node using the location information further comprises:

transmitting the message to the identified node via the DHT overlay network, such that the identified node is operable to forward the message to the second wireless community.

5. The method of claim 3, wherein muting the message to a second wireless community including the second wireless node using the location Information further comprises:
transmitting a request for the location information for the second wireless node to the identified node via the DHT overlay network; and
transmitting the message to the second wireless community using the location information received from the identified node in response to the request.

6. The method of claim 1, further comprising:
receiving the message from the first wireless node at a wired node in the first wireless community using a first wireless protocol;
transmitting the message to a node in the DHT overlay network storing the location information for the second wireless node;
receiving the message from the node in the DHT overlay network at a wired node in the second wireless community; and
transmitting the message to the second wireless node using a second wireless protocol.

7. The method of claim 1, further comprising:
registering location information for the second wireless node in the DHT overlay network.

8. The method of claim 7, wherein registering location information for the second wireless node in the DHT overlay network further comprises:
hashing a unique ID for the second wireless node; and
identifying a node in the DHT overlay network to store the location information for the second wireless node based on the hashed ID; and
transmitting the location information to the identified node for storage in the identified node.

9. The method of claim 7, further comprising:
storing the location information for the second wireless node in at least two nodes in the DHT overlay network, wherein one of the at least two nodes has a lower latency to a wired node for the second wireless community.

10. The method of claim 1, further comprising:
receiving the message at a wired node in the second wireless community;
using a local wireless protocol and discovery in the second wireless community to send the message from the wired node to the second wireless node.

11. A node in a peer-to-peer network including a plurality of nodes organized as a DHT overlay network, the node comprising:
means for storing location information for wireless communities connected to the peer-to-peer network, each wireless community including a plurality of wireless devices that are configured to communicate with each other using a wireless protocol when within a predetermined range;
means for receiving new location information for the wireless nodes as the wireless nodes move from one of the wireless communities to another one of the wireless communities and for storing the new location information in the means for storing, wherein the new location information for each moving wireless node includes a location of the wireless community of which the moving wireless node is a member;
means for receiving a message via the DHT overlay network from a first wireless node in a first wireless community of the wireless communities, the message being for a second wireless node in a second wireless community of the wireless communities; and
means for determining whether location information for the second wireless community is stored in the means for storing.

12. The node of claim 11, further comprising:
means for retrieving the location information for the second wireless node from the means for storing in response to the means for determining the means for storing stores the location information for the second wireless node; and
means for transmitting the message to a second wireless community including the second wireless node in response to the location information for the second wireless node not being stored in the means for storing.

13. The node of claim 11, further comprising:
means for routing the message via the DHT overlay network to another node in the DHT overlay network storing the location information for the second wireless node.

14. The node of claim 11, further comprising:
means for receiving a request for location information via the DHT overlay network; and
means for transmitting the location information to a node outside the DHT overlay network generating the request.

15. An apparatus comprising:
a node in a first wireless community of a plurality of wireless communities, the node including a first wireless interface and a second wired interface;
wherein the node registers nodes in the first wireless community in a DHT overlay network storing location information for the plurality of wireless communities, each wireless community including a plurality of wireless devices that are configured to communicate with each other using a wireless protocol when within a predetermined range, wherein registering includes storing location information for the first wireless community in the DHT overlay network for any new nodes joining the first wireless community such that the DHT overlay network is maintained with current location information for wireless nodes as the wireless nodes move from one wireless community of the plurality of wireless communities to the first wireless community;
wherein the node is operable to receive a message from a first wireless node in the first wireless community via the first wireless interface, wherein the message is being sent to a second wireless node in a second wireless community of the plurality of wireless communities; and
wherein the node is operable to identify a node in the DHT overlay network storing location information for the second wireless community and transmit the message to the node in the DHT overlay network via the wired interface.

16. The apparatus of claim 15, wherein the node is operable to hash a unique ID of the second wireless node to identify the node in the DHT overlay network storing the location information for the second wireless node.

17. The apparatus of claim 15, wherein the first wireless community and the second wireless community use different wireless protocols to communicate with members of their respective communities.

18. Computer software embedded on a tangible computer readable medium, the computer software comprising instructions performing:

determining whether a message received from a first wireless node in a first wireless community is for a second wireless node not in the first wireless community or whether the message is for a wireless node in the first wireless community; and determining location information for the second wireless node using a DHT overlay network in response to the message being for the second wireless node, "wherein the determining of the location information includes hashing a unique ID for the second wireless node to identify a node in the DHT overlay network storing location information for a second wireless community including the second wireless node, and"

the DHT network stores location information for a plurality of wireless communities and is updated with new location information for wireless nodes as the wireless nodes move from one of the wireless communities to another one of the wireless communities; and sending the message via a wireless network in the first wireless community to the second wireless node in response to determining the message is for a wireless node in the first wireless community.

19. The computer software embedded on a tangible computer readable medium of claim 18 further comprising instructions performing:

hashing a unique ID for the first wireless node; and identifying a node in the DHT overlay network to store location information for the first wireless node based on the hashed ID.

20. The computer software embedded on a tangible computer readable medium of claim 18 further comprising instructions performing:

identifying a node in the DHT overlay network to store location information for the first wireless node based on latency to the node.

* * * * *

UNITED STATES PATENT AND TRADEMARK OFFICE
CERTIFICATE OF CORRECTION

| | | |
|---|---|---|
| PATENT NO. | : 7,643,458 B1 | Page 1 of 1 |
| APPLICATION NO. | : 11/137838 | |
| DATED | : January 5, 2010 | |
| INVENTOR(S) | : Vanish Talwar et al. | |

It is certified that error appears in the above-identified patent and that said Letters Patent is hereby corrected as shown below:

In column 9, line 5, in Claim 5, delete "muting" and insert -- routing --, therefor.

In column 9, line 7, in Claim 5, delete "Information" and insert -- information --, therefor.

Signed and Sealed this

Ninth Day of November, 2010

David J. Kappos
*Director of the United States Patent and Trademark Office*